United States Patent
Li

(10) Patent No.: US 12,386,179 B2
(45) Date of Patent: Aug. 12, 2025

(54) OPTICAL WAVEGUIDE SYSTEM WITH ANGLE-MULTIPLEXING POLARIZATION VOLUME GRATING AND ELECTRONIC DEVICE

(71) Applicant: Goertek Inc., Shandong (CN)

(72) Inventor: Lingshan Li, San Jose, CA (US)

(73) Assignee: Goertek Inc., Shandong (CN)

( * ) Notice: Subject to any disclaimer, the term of this patent is extended or adjusted under 35 U.S.C. 154(b) by 460 days.

(21) Appl. No.: 17/733,340

(22) Filed: Apr. 29, 2022

(65) Prior Publication Data
US 2023/0350138 A1    Nov. 2, 2023

(51) Int. Cl.
| G02B 27/01 | (2006.01) |
| F21V 8/00 | (2006.01) |
| G02B 6/42 | (2006.01) |
| G02B 27/28 | (2006.01) |

(52) U.S. Cl.
CPC ....... G02B 27/0172 (2013.01); G02B 6/0075 (2013.01); G02B 6/4213 (2013.01); G02B 27/286 (2013.01)

(58) Field of Classification Search
CPC ............... G02B 6/0075; G02B 6/4213; G02B 27/0172; G02B 27/286
See application file for complete search history.

(56) References Cited

U.S. PATENT DOCUMENTS

| 11,067,811 | B2 | 7/2021 | Chi et al. |
| 11,150,408 | B2 | 10/2021 | Waldern et al. |
| 11,314,093 | B2 * | 4/2022 | McEldowney .... G02B 27/0172 |
| 11,474,352 | B2 * | 10/2022 | Calafiore ........... G02B 27/0172 |
| 2018/0239177 | A1 * | 8/2018 | Oh ...................... G02F 1/13718 |
| 2020/0081252 | A1 | 3/2020 | Jamali et al. |
| 2020/0371280 | A1 | 11/2020 | Geng et al. |
| 2021/0055551 | A1 | 2/2021 | Chi et al. |
| 2023/0176368 | A1 * | 6/2023 | He ........................ G06T 3/4038 348/36 |

(Continued)

OTHER PUBLICATIONS

Improved Saturation and Wide viewing angle color filters based on multi-twist retarders by Li, et al., vol. 29, No. 3, Feb. 2021, Optics Express, 4124.

(Continued)

*Primary Examiner* — Daniel Petkovsek
(74) *Attorney, Agent, or Firm* — Baker Botts LLP

(57) ABSTRACT

An optical waveguide system with angle-multiplexing polarization volume gratings and an electronic device are disclosed. The system comprises: a waveguide; an input coupler coupling a combined image light for a combined image into the waveguide; and an output coupler coupling the combined image light out of the waveguide. The combined image light includes a first image light for a first image and a second image light for a second image, which are combined to form the combined image. The first image light and the second image light have different polarizations. The output coupler includes first and second output polarization volume gratings, which are optimized for different polarizations, respectively, wherein the first output polarization volume grating couples the first image light out of the waveguide, and the second output polarization volume grating couples the second image light out of the waveguide.

9 Claims, 4 Drawing Sheets

(56) References Cited

U.S. PATENT DOCUMENTS

2023/0185091 A1* 6/2023 He .......................... G02B 5/32
                     385/147

OTHER PUBLICATIONS

Super Achromatic wide-angle quarter-wave plates using multi-twist retarders by Li, et al., vol. 29, No. 5, Mar. 2021, Optics Express, 7464.
Numerical analysis of Bragg Polarization gratings by Xiang, et al., vol. 36, No. 5, May 2019, Journal of Optical Society of America.
Nanoscale liquid crystal polymer bragg polarization gratings by Xiang, et al., vol. 25, No. 16, Aug. 7, 2017, Optics Express, 19298.
Bragg polarization gratings for wide angular bandwidth and high efficiency at steep deflection angles by Xiang, et al., Nature.com/ Scientific Reports, Published May 8, 2018.
Reflective polarization volume gratings for high efficiency waveguide-coupling augmented reality displays by Lee, et al., vol. 25, No. 22, Oct. 30, 2017, Optics Express. 27008.
Polarization volume gratings for near-eye displays and novel photonic devices by Yin, et al., Crystals 2020, 10, 561.
Solc-style Color Filters based on Multi-Twist Retarders by Li, et al., Proc. of SPIE vol. 11483, Aug. 21, 2020.

* cited by examiner

OPTICAL WAVEGUIDE SYSTEM WITH ANGLE-MULTIPLEXING POLARIZATION VOLUME GRATING AND ELECTRONIC DEVICE

FIELD OF THE INVENTION

This disclosure relates to the technical field of optical waveguide system, and more specifically, to an optical waveguide system with angle-multiplexing polarization volume gratings and an electronic device.

BACKGROUND OF THE INVENTION

In an optical display system such as a near-eye display (NED) system, a ray emerged from a display with certain field of view (FOV) is in-coupled to a waveguide (WG) by an input coupler grating (ICG), undergoes total internal reflection (TIR) and pupil expansion, and is finally out-coupled by an output coupler grating (OCG).

U.S. patent application Ser. No. 17/566,048 discloses an optical waveguide system and an electronic device, which is hereby incorporated in its whole by reference.

The article of "Improved saturation and wide-viewing angle color filters based on multi-twist retarders" by Li L, Shi S, Escuti M J in Opt Express. 2021; 29(3):4124-4138 discloses saturation and wide-viewing angle color filters based on multi-twist retarders, which is hereby incorporated in its whole by reference.

The article of "Super achromatic wide-angle quarter-wave plates using multi-twist retarders" by Li L, Escuti M J in Opt Express. 2021; 29(5):7464-7478 discloses achromatic wide-angle quarter-wave plates using multi-twist retarders, which is hereby incorporated in its whole by reference.

The article of "Numerical analysis of Bragg polarization gratings" by Xiang X, Escuti M J in JOSA B. 2019; 36(5):D1-D8 discloses Bragg polarization gratings, which is hereby incorporated in its whole by reference.

The article of "Nanoscale liquid crystal polymer Bragg polarization gratings" by Xiang X, Kim J, Komanduri R, Escuti M J in Opt Express. 2017; 25(16):19298. doi: 10.1364/OE.25.019298 discloses nanoscale liquid crystal polymer Bragg polarization gratings, which is hereby incorporated in its whole by reference.

The article of "Bragg polarization gratings for wide angular bandwidth and high efficiency at steep deflection angles" by Xiang X, Kim J, Escuti M J in Sci Rep. 2018; 8(1):7202. doi: 10.1038/s41598-018-25535-0 discloses Bragg polarization gratings, which is hereby incorporated in its whole by reference.

The article of "Reflective polarization volume gratings for high efficiency waveguide-coupling augmented reality displays" by Lee Y-H, Yin K, Wu S-T in Opt Express. 2017; 25(22):27008. doi: 10.1364/OE.25.027008 discloses reflective polarization volume gratings, which is hereby incorporated in its whole by reference.

The article of "Volume Bragg gratings for near-eye waveguide display" by Chi W, Lee H Y, Saarikko P Published online in 2021 discloses volume Bragg gratings, which is hereby incorporated in its whole by reference.

The article of "Dispersion compensation in volume bragg grating-based waveguide display" by Chi W, Meiser D, Yang Y, Lam W S T, Saarikko P Published online in 2021 discloses a volume bragg grating-based waveguide display, which is hereby incorporated in its whole by reference.

The article of "Optical waveguide beam splitter with polarization volume gratings for display" by Geng Y, Gollier, Jacques in Amirsolaimani B. 2021; 2 discloses polarization volume gratings, which is hereby incorporated in its whole by reference.

The article of "Polarization-sensitive components in optical systems for large pupil acceptance angles" by Amali A, Lu L, Maimone A, Moheghi A, Lam W S T, McEldowney, S. Charles Lanman D R Published online in 2020 discloses polarization-sensitive components in optical systems for large pupil acceptance angles, which is hereby incorporated in its whole by reference.

The article of "Holographic waveguides incorporating birefringence control and methods for their fabrication" by David W J, Popvich M, Grant A J. Search Published online in 2021 discloses holographic waveguides, which is hereby incorporated in its whole by reference.

The article of "Polarization volume gratings for near-eye displays and novel photonic devices" by Yin K, Zhan T, Xiong J, He Z, Wu S-T in Crystals. 2020; 10(7):561 discloses polarization volume gratings for near-eye displays, which is hereby incorporated in its whole by reference.

The article of "Solc-style birefringent color filters based on multi-twist retarders" by Li L, Shi S, Escuti M J. In: Hahlweg C F, Mulley J R, eds in Novel Optical Systems, Methods, and Applications XXIII. Vol 11483. SPIE; 2020: 136-149. doi: 10.1117/12.2569133 discloses Solc-style birefringent color filters based on multi-twist retarders, which is hereby incorporated in its whole by reference.

SUMMARY OF THE INVENTION

One object of this disclosure is to provide a new technical solution for an optical waveguide system.

According to a first aspect of the present disclosure, there is provided an optical waveguide system, comprising: a waveguide; an input coupler, provided at an input side of the waveguide and coupling a combined image light for a combined image into the waveguide; and an output coupler, provided at an output side of the waveguide and coupling the combined image light out of the waveguide. The combined image light includes a first image light for a first image and a second image light for a second image, and the first image and the second image are combined to form the combined image. The first image light and the second image light have different polarizations. The output coupler includes a first output polarization volume grating and a second output polarization volume grating, and the first output polarization volume grating and the second output polarization volume grating are optimized for different polarizations, respectively. The first output polarization volume grating couples the first image light out of the waveguide, and the second output polarization volume grating couples the second image light out of the waveguide.

According to a first aspect of the present disclosure, there is provided an electronic device, comprising: a display, which generates a combined image light for a combined image; and an optical waveguide system according to an embodiment, which receives the combined image light.

According to an embodiment of this disclosure, a performance of an optical waveguide system can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the invention.

DETAILED DESCRIPTION OF THE EMBODIMENTS

Figure 1:
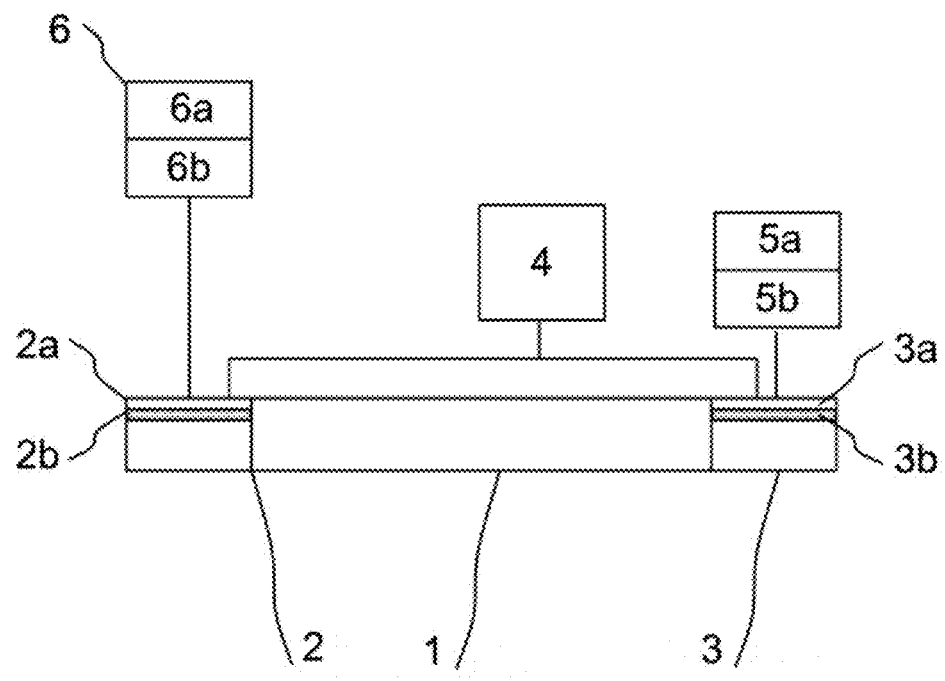
FIG. 1 shows a schematic diagram of an optical waveguide system according to an embodiment.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 shows a schematic diagram of an optical waveguide system according to an embodiment.

In FIG. 1, an electronic device comprises a display unit 6 and an optical waveguide system.

The display unit 6 may include a first display element 6a and a second display element 6b. For example, the first display element 6a generates a first image light for a first image and the second display element 6b generates a second image light for a second image. The first image light and the second image light can be combined into a combined image light, and the first image and the second image can be combined to form a combined image. The first image and the second image can be different portions of an image. In this regard, when the first image and the second image are combined, a performance such as brightness, resolution and so in at least one part of the image may be improved. Alternatively, the first image and the second image can be different images. As such, an overlapped image may be obtained.

The optical waveguide system comprises: a waveguide 1, an input coupler 2 and an output coupler 3.

As shown in FIG. 1, the input coupler 2 is provided at an input side of the waveguide 1. The input coupler 2 couples the combined image light into the waveguide. The output coupler 3 is provided at an output side of the waveguide 1 and couples the combined image light out of the waveguide 1. As described above, the combined image light includes a first image light for a first image, a second image light for a second image, and the first image and the second image are combined to form the combined image.

Here, the first image light and the second image light have different polarizations. The output coupler 3 includes a first output polarization volume grating 3a and a second output polarization volume grating 3b. The first output polarization volume grating 3a and the second output polarization volume grating 3b are optimized for different polarizations, respectively. For example, the first output polarization volume grating 3a is optimized for left-hand-circular polarization (LCP) and the second output polarization volume grating 3b is optimized for right-hand-circular polarization (RCP). The first output polarization volume grating 3a couples the first image light out of the waveguide 1, and the second output polarization volume grating 3b couples the second image light out of the waveguide 1.

In this embodiment, two image lights for two images are transferred in the same waveguide and at the output end, the two image lights can be separated by using polarization volume gratings. This provides more freedom of design for designing the system. Further, by using polarized light in the waveguide, a relatively consistent performance of the light travelling in the waveguide can be achieved so that the final display quality can be improved.

In an embodiment, as shown in FIG. 1, the input coupler includes: a first input polarization volume grating 2a and a second input polarization volume grating 2b. The first input polarization volume grating 2a and the second input polarization volume grating 2b are optimized for different polarizations, respectively. The first input polarization volume grating 2a couples the first image light into the waveguide 1, and the second input polarization volume grating 2b couples the second image light into the waveguide 1. Similar with the output polarization volume gratings, the first input polarization volume grating 2a may be optimized for left-hand-circular polarization (LCP) and the second input polarization volume grating 2b may be optimized for right-hand-circular polarization (RCP).

The first input polarization volume grating 2a and the first output polarization volume grating 3a may be optimized for the same polarization or different polarizations. The second input polarization volume grating 2b and the second output polarization volume grating 3b may be optimized for the same polarization or different polarizations.

Here, a grating being optimized for a polarization means that most of a light with such a polarization will go through desired processing such as reflection, diffraction and so on in the grating. Most of a light with different polarization will not go through such a processing.

In an embodiment, the second image has a higher resolution than that of the first image, and the second image light has a smaller FOV than that of the first image light. Normally, it is difficult to improve the resolution and the FOV (Field of View) at the same time. In this embodiment, the resolution of part of the combined image can be improved without significantly affecting the FOV.

In another embodiment, the second image has a pixel location shift of less than one pixel length. For example, the second image and the first image can be the same. By shifting the two images, a desired result may be obtained. For example, the pixel location shift is 0.5-pixel length. As such, the resolution of the combined image can be improved. Alternatively, the pixel location shift can be 0-pixel length. In this regard, the brightness of the combined image can be improved.

As shown in FIG. 1, the optical waveguide system according to claim 1, further comprising: a pupil tracking unit 4. The pupil tracking unit 4 can determine a pupil position of an eye, so that a position of the second image can be adjusted according to the pupil position. For example, when a user's eye focuses on a different part of an image, the resolution of that part can be increased. This will improve the viewing experience of a user.

For example, the second output polarization volume grating 3b is an electrically controlled polarization volume grating. The position of the second image can adjusted by electrically controlling the electrically controlled polarization volume grating.

In another embodiment, the second image is a labelled image, including a labelled position for the second image, and a position of the second image can be adjusted according to the labelled position. In this regard, the content provider can guide a user to view a target content, such as an advertisement, a notification and so on. This will improve the efficiency for promoting the target content.

In this embodiment, the second output polarization volume grating can also be an electrically controlled polarization volume grating, and the position of the second image can be adjusted by electrically controlling the electrically controlled polarization volume grating.

As shown in FIG. 1, the optical waveguide system can further comprise: an optical unit 5a, 5b. The optical unit 5a, 5b is placed after the output coupler 3 and receives the combined image light coupled out of the waveguide 1 by the output coupler 3. The first image is a far-view image and the second image is a near-view image. The optical unit 5a focuses the first image light to a negative focal length and The optical unit 5b focuses the second image light to a positive focal length. The optical unit may include a first sub-unit 5a and a second sub-unit 5b, which are optimized for the first image light and the second image light, respectively.

Figure 2:
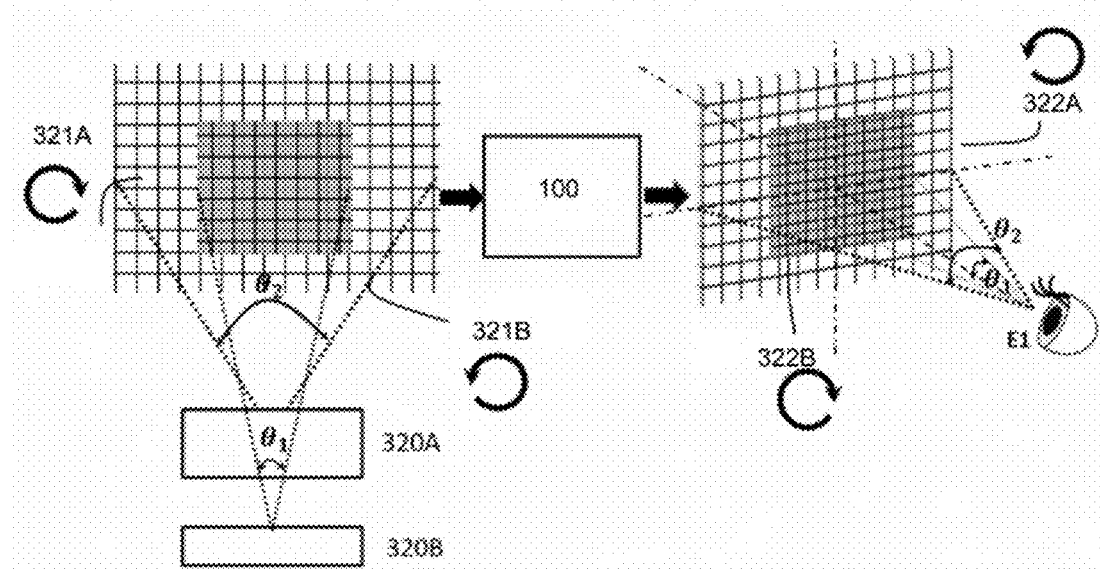
FIG. 2 shows a schematic configuration of an optical waveguide system according to an embodiment.

FIG. 2 shows a schematic configuration of an optical waveguide system according to an embodiment.

In the embodiment of FIG. 2, a super resolution is obtained by using angle multiplexing polarization gratings (PVGs). As shown in FIG. 2, the display element 320A generates a first image light of low-resolution with larger FOV $\theta_1$ and the display element 320B generates a second image light of high-resolution with smaller FOV $\theta_2$. The first image light emerged from the display element 320A forms the Grid A image, which has normal pixel location. The image Grid A is then transmitted through a quarter-wave plate (QWP) with slow axis at 45° to create a right-hand-circular polarization (RCP). The second image light emerged from the display element 320B forms the Grid B image. The Grid B image has pixel location shift 0.5-pixel length. The second image light is then transmitted through a quarter-wave plate (QWP) with slow axis at −45° to create a left-hand-circular polarization (LCP). This composed image of Grid A image and Grid B image then undergoes TIR in the waveguide 100 and is out-coupled as Grid A' image and Grid B' image, which retain their respective FOV and enter a human eye E1. The out-coupling Image still have orthogonal circular polarization, but human eye cannot detect the polarization difference of these two. The circular polarization also benefits the stability of the heads-up-displays (HUDs) in that when user move their head, the circular polarization image still keep its brightness.

Figure 3:
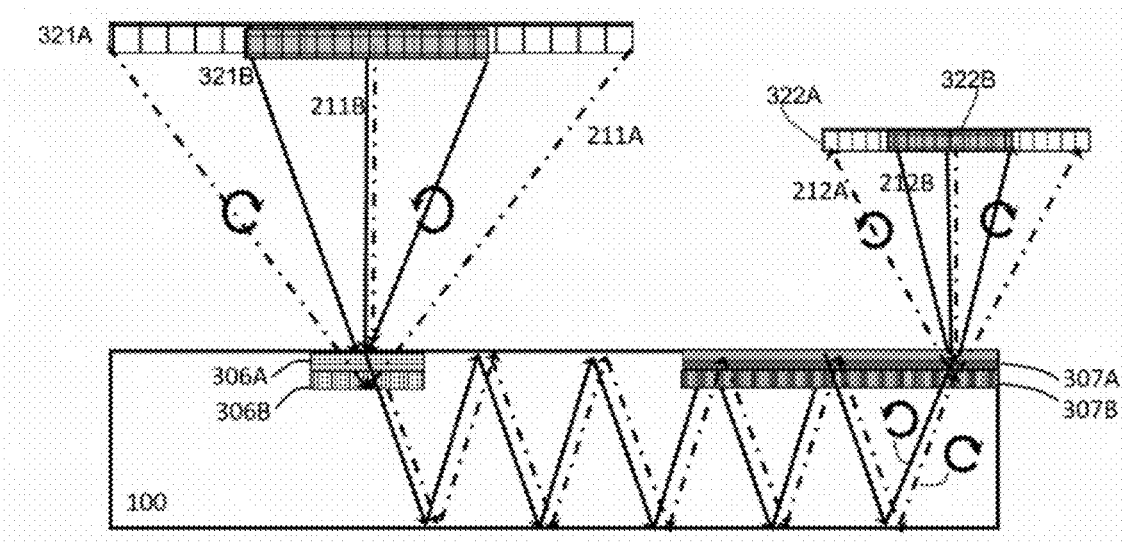
FIG. 3 shows a schematic diagram of an optical waveguide system according to an embodiment.

FIG. 3 shows a schematic diagram of an optical waveguide system according to an embodiment.

As shown in FIG. 3, the rays 211A emerged from the Grid A image 321A has a wider FOV and RCP polarization, and the rays 211B from Grid B image 321B has a smaller FOV and LCP polarization. The rays 211A and the rays 211B transmit through the PVG stack composed by PVG 306A and PVG 306B, which is optimized respectively for FOV±15° and FOV±30°. The output rays of PVG 306A and PVG 306B have orthogonal circular polarizations. The polarizations of the rays can flip the circular polarization chirality each time TIR occurs. This leads to the input of the PVG 307A and the PVG 307B to have same circular polarization as the input or to have opposite polarizations. After the PVG 307A and the PVG 307B, the circular polarization of each image flips one more time, resulting to output rays 212A having LCP, which corresponding to the Grid A' image 322A, and output the rays 212B having RCP, which corresponding to the Grid B' image 322B. Because the Grid B' image 322B has a 0.5-pixel shift with respect to the Grid A' image 322A, the resolution for the area of the Grid B' image 322B will be increased.

Figure 4:
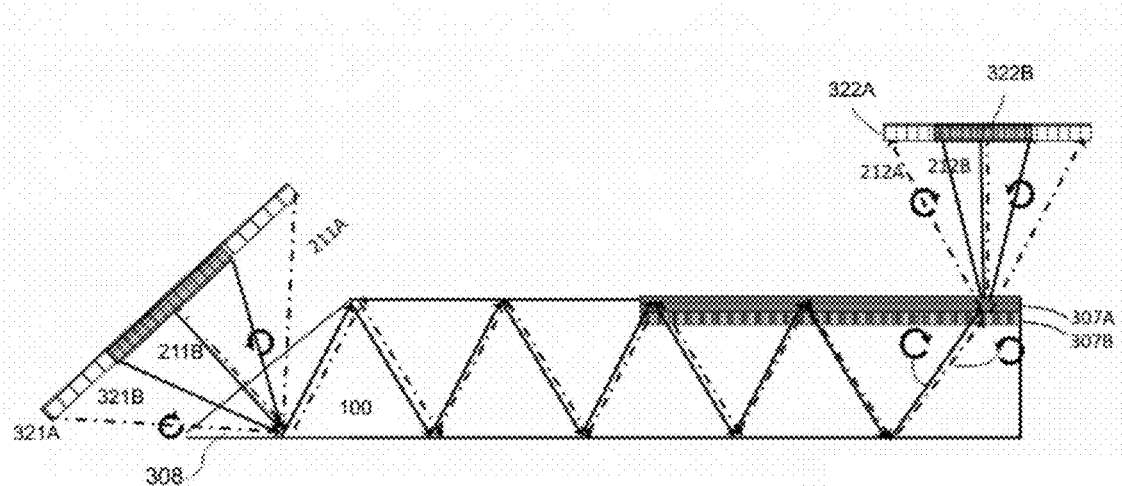
FIG. 4 shows a schematic diagram of an optical waveguide system according to an embodiment.

FIG. 4 shows a schematic diagram of an optical waveguide system according to an embodiment. The difference between the embodiment of FIG. 4 and that of FIG. 3 lies in that the input coupler of FIG. 4 is a prism. The repeated description will be omitted.

Figure 5:
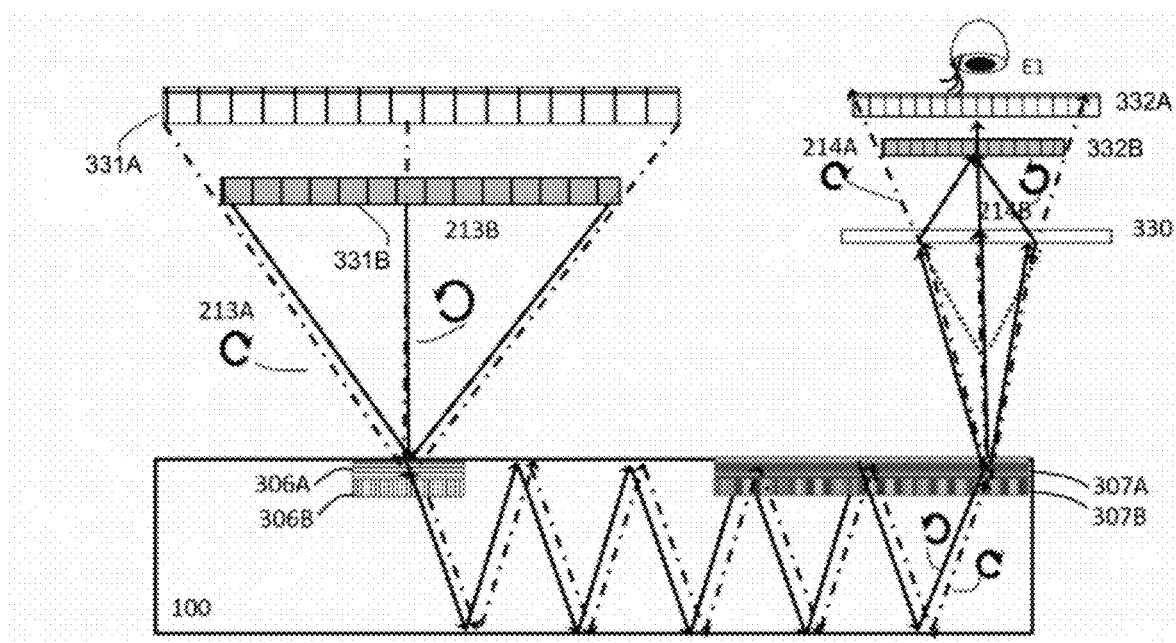
FIG. 5 shows a schematic diagram of an optical waveguide system according to an embodiment.

FIG. 5 shows a schematic diagram of an optical waveguide system according to an embodiment.

In this embodiment, a multi-focal depth image is obtained by using angle-multiplexing PVGs. As shown in FIG. 5, the far-view image shown on one displays generates rays 211A with RCP polarization, which corresponds to a Grid A image 321A. The near-view image of another displays generates rays 211B with LCP polarization, which corresponds to a Grid B image 321B. Rays 211A and 211B can have similar or different FOV. These two bunches of rays are then diffracted respectively through a PVG 306A and a PVG 306B, which operates on RCP and LCP, respectively. The orthogonal polarized rays transmit through the waveguide 100 independently and are finally out-coupled by a PVG 307A and a PVG 307B. Geometric phase lens 330 is configured to focus the LCP rays 212B, corresponding to the near view 322B to the positive focal length, and to focus the RCP rays 212A to the negative focal length as far view 322A.

Figure 6:
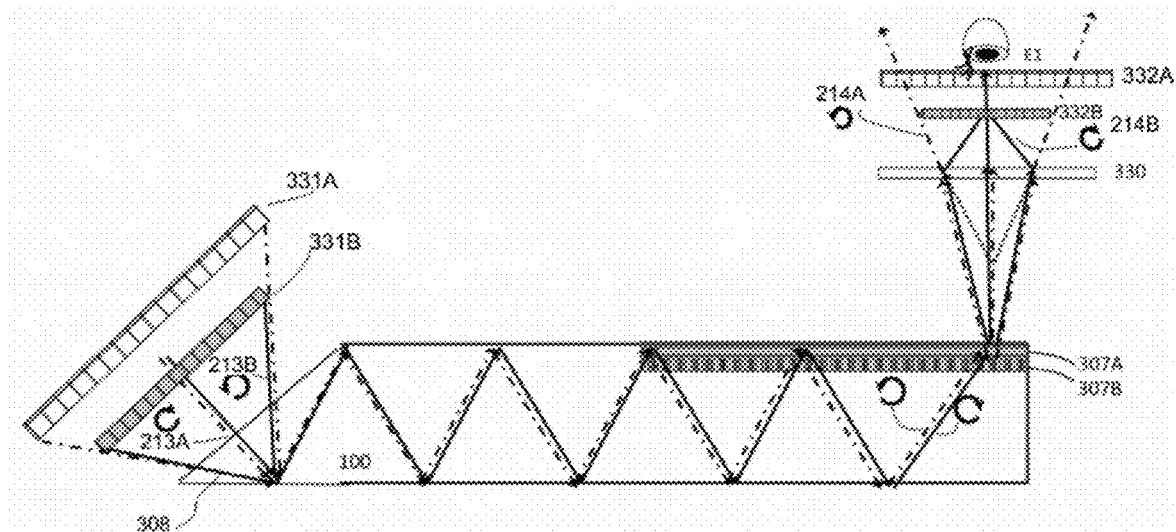
FIG. 6 shows a schematic diagram of an optical waveguide system according to an embodiment.

FIG. 6 shows a schematic diagram of an optical waveguide system according to an embodiment. The difference between the embodiment of FIG. 6 and that of FIG. 5 lies in that the input coupler of FIG. 6 is a prism. The repeated description will be omitted.

Figure 7:
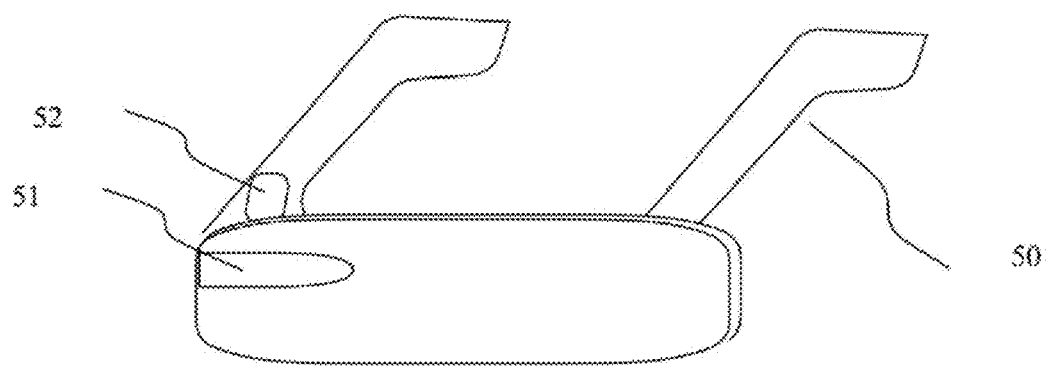
FIG. 7 shows an example of an electronic device.

FIG. 7 shows an example of an electronic device according to an embodiment. In FIG. 7, the electronic device 50 may be a near-eye display such as an AR glass. The electronic device 50 may include a display 52 and an optical display system 51 as described above. The display 52 generates a combined image light for a combined image. The optical display system 51 receives the combined image light.

Although some specific embodiments of the present invention have been demonstrated in detail with examples, it should be understood by a person skilled in the art that the above examples are only intended to be illustrative but not to limit the scope of the present disclosure.

What is claimed is:

1. An optical waveguide system, comprising
a waveguide;
an input coupler, provided at an input side of the waveguide and coupling a combined image light for a combined image into the waveguide;
an output coupler, provided at an output side of the waveguide and coupling the combined image light out of the waveguide; and
a pupil tracking unit, which determines a pupil position of an eye,
wherein the combined image light includes a first image light for a first image and a second image light for a second image, and the first image and the second image are combined to form the combined image,
wherein the first image light and the second image light have different polarizations,
wherein the output coupler includes a first output polarization volume grating and a second output polarization volume grating, and the first output polarization volume grating and the second output polarization volume grating are optimized for different polarizations, respectively,
wherein the first output polarization volume grating couples the first image light out of the waveguide, and the second output polarization volume grating couples the second image light out of the waveguide,
wherein a position of the second image is adjusted according to the pupil position,
wherein the second output polarization volume grating is an electrically controlled polarization volume grating, and the position of the second image is adjusted by electrically controlling the electrically controlled polarization volume grating.

2. The optical waveguide system according to claim 1, wherein the input coupler includes:
a first input polarization volume grating; and
a second input polarization volume grating,
wherein the first input polarization volume grating and the second input polarization volume grating are optimized for different polarizations, respectively,
wherein the first input polarization volume grating couples the first image light into the waveguide, and the second input polarization volume grating couples the second image light into the waveguide.

3. The optical waveguide system according to claim 1, wherein the second image has a higher resolution than that of the first image, and the second image light has a smaller FOV than that of the first image light.

4. The optical waveguide system according to claim 1, wherein the second image has a pixel location shift of less than one pixel length.

5. The optical waveguide system according to claim 4, wherein the pixel location shift is 0.5-pixel length.

6. The optical waveguide system according to claim 1, wherein the second image is a labelled image, including a labelled position for the second image, and
wherein a position of the second image is adjusted according to the labelled position.

7. The optical waveguide system according to claim 1, further comprising:
an optical unit, placed after the output coupler and receiving the combined image light coupled out of the waveguide by the output coupler,
wherein the first image is a far-view image and the second image is a near-view image,
wherein the optical unit focuses the first image light to a negative focal length and focuses the second image light to a positive focal length.

8. An electronic device, comprising:
a display, which generates a combined image light for a combined image; and
an optical waveguide system according to claim 1, which receives the combined image light.

9. The optical waveguide system according to claim 3, wherein the combined image light has a FOV equal to that of the first image light.

* * * * *